(12) United States Patent
Cao (10) Patent No.: US 9,405,385 B2
(45) Date of Patent: Aug. 2, 2016

(54) INTERACTIVE PROJECTION APPARATUS AND THE POSITIONING METHOD OF THE INTERACTIVE PEN

(71) Applicant: Sony Corporation, Minato-ku (JP)

(72) Inventor: Yang Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 249 days.

(21) Appl. No.: 14/258,443

(22) Filed: Apr. 22, 2014

(65) Prior Publication Data

US 2014/0333587 A1    Nov. 13, 2014

(30) Foreign Application Priority Data

May 7, 2013 (CN) .......................... 2013 1 0164955

(51) Int. Cl.
*G06F 3/033* (2013.01)
*G06F 3/0354* (2013.01)
*G06F 3/03* (2006.01)

(52) U.S. Cl.
CPC .......... *G06F 3/03545* (2013.01); *G06F 3/0317* (2013.01)

(58) Field of Classification Search
USPC ......................................... 345/175, 178–179
See application file for complete search history.

(56) References Cited

U.S. PATENT DOCUMENTS 6,618,076 B1 * 9/2003 Sukthankar .............. H04N 5/74
345/156
2011/0169778 A1 * 7/2011 Nungester ........... G06F 3/03542
345/175
2011/0181636 A1 * 7/2011 Fukazawa ............ G02B 27/646
345/697

* cited by examiner

*Primary Examiner* — Joseph Haley
*Assistant Examiner* — Ifedayo Iluyomade
(74) *Attorney, Agent, or Firm* — Oblon, McClelland, Maier & Neustadt, L.L.P.

(57) ABSTRACT

The invention discloses an interactive projection apparatus, which includes a control device, a projection device, an image acquisition device, and an interactive pen, wherein position identification unit of the control device employs a position identification image to identify installation mode of the projection device, and the position identification image is longitudinally asymmetric about its horizontal centerline, and is laterally asymmetric about the vertical centerline. The invention also discloses a positioning method of the interactive pen of the interactive projection apparatus: projecting the position identification image onto the projection plane; collecting the position identification projection image on the projection plane; identifying the installation mode of the projection device according to the relationship between the position identification projection image and the position identification image; collecting the coordinate of the position pointed by the interactive pen on the projection image, and calculating the corresponding coordinate on the image to be projected. The invention allows automatic correction before or after the identification of the installation mode of the projection device, by projecting the correction image and collecting the correction projection image on the projection plane, and then performing correction of the coordinate of the correction projection image against the corresponding coordinate of the correction image.

18 Claims, 5 Drawing Sheets

INTERACTIVE PROJECTION APPARATUS AND THE POSITIONING METHOD OF THE INTERACTIVE PEN

TECHNICAL FIELD

The invention generally relates to an interactive projection apparatus, and in particular relates to a method of the identification of the installation mode (front-projective, rear-projective, ceiling-type, and desktop-type) and of the positioning of the interactive pen and its implementing device thereof based on automatic correction.

BACKGROUND

With the fast development of computer technology, multimedia apparatus is ever more widely used for displaying a rich plurality of contents, such as texts, sound, image and video. Correspondingly, projection apparatus capable of displaying big image finds wide applications and quick development. The inability of early stage projection systems to enable interaction between man and screen limits the scope of application, especially in the case of teaching in the classroom and game entertaining. This makes the need for interaction and real-life experience cannot be satisfied.

At present, there are two kinds of interactive projection systems at home and broad, which are technically mature, one is based on electronic whiteboard, and the other one employs interactive device. The former is designed with touch screen, infrared array, electromagnetic induction, and laser scanning, and other techniques. Albeit with high positioning dependability and precision, its dependence on specially made projection screens excludes the possibility of inter-operations on each projection plane, and results in inconvenience of installation and usage as well as high cost. By contrast, the projection system employing an interactive pen to position the pen point precisely via the interactive pens and the corresponding receivers, has no prerequisite for the projection plane, are capable of writing and touch operations in any projection plane, and are therefore receiving ever more attraction and affirmation.

The interactive projection system mainly consists of a control and processing unit, a memory unit, a projection unit, an image acquisition unit, and a projection plane, wherein the control and processing unit is connected via communication connections with the image acquisition unit, the projection unit, and the memory unit; the projection unit is employed for displaying image information on the projection plane; the image acquisition unit is employed for collecting image information on the projection plane and for transmitting the collected data information to the control and processing unit; the memory unit stores correction image, text data, correction formulas, and coordinate transformation programs.

An interactive projection system requires position correction before usage, and manual operation is the common currently adopted measure. The control and processing unit, subsequent to receiving a correction instruction, invokes correction data on the memory unit, and actuates the projection unit to project correction image onto the projection plane. The correction image on the projection plane has calibration points arranged in rectangular array mode, with one calibration point arranged in each of the four corners of the correction image, wherein the horizontal calibration points are spaced apart with a same distance, and the vertical calibration points are spaced apart with a same distance. The calibration points appear one by one (each correction image with one calibration point, with each of the plurality of correction image appears one by one; or each of the plurality of calibration points in a correction image appears one by one), and by employing an interactive pen to click these calibration points one by one manually, and to collect the absolute coordinate of each of the calibration point via the image acquisition unit, a manual position correction is realized, albeit being a low efficient correction wasting large amount of time and man power.

Figure 1:
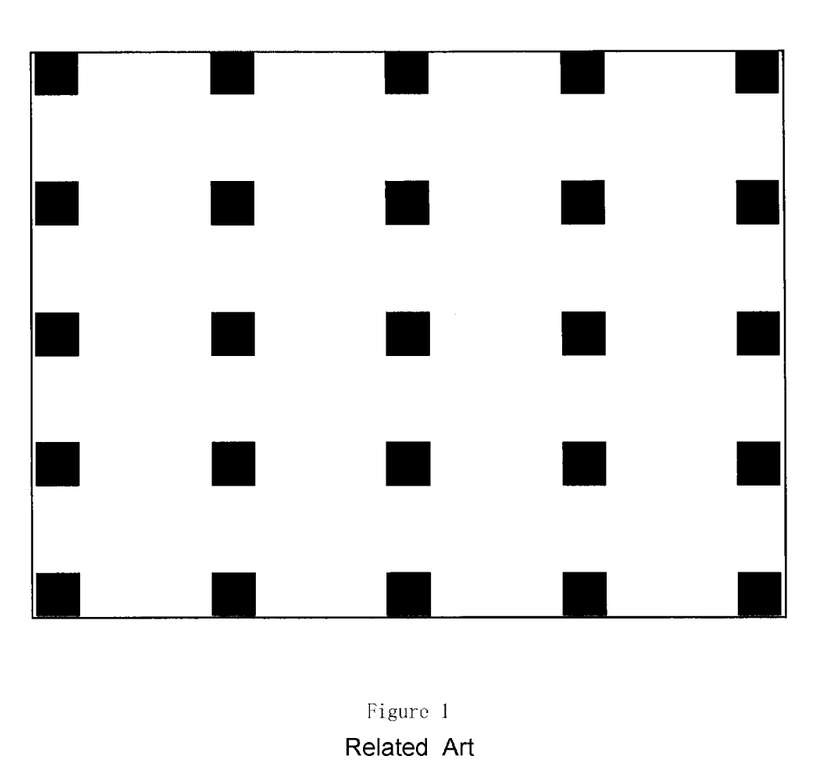
FIG. 1 is a correction image employed by the interactive projection apparatus in automatic correction.

Another method of position correction is automatic correction, wherein the control and processing unit, after receiving a correction instruction, invokes a correction image in the memory unit or storage area of the computer connected with the projector. The correction image is shown in FIG. 1, with standard black squares arranged in rectangular array mode (with one black square at each of the four corners of the correction image, the horizontal black squares being spaced apart with a same distance, the vertical black squares being spaced apart with a same distance). The correction image is projected onto the projection plane by the projection unit, the positions of the black squares thereof are captured by the image acquisition unit, and their absolute coordinates on the projection plane are obtained, thereby arriving at a same effect as the manual correction with manual clicking with an interactive pen. Such a method of automatic correction is convenient, saves time, and increases the efficiency of position correction. However, compared with manual correction, the automatic correction has no means of knowing the starting position of the calibration points. Further, viewed from the coordinate system (the XY coordinate system) constructed by the horizontal centerline and the vertical centerline of the correction image, the black squares of the correction image are longitudinally and laterally symmetric, and hence with the employment of the automatic correction, the projected image is the same, regardless of whether the projector is placed on a desktop or hung up in the ceiling, or whether the projection system is front-projective or rear-projective; and therefore the installation mode of the projection system is not identifiable, resulting in incapability of precise positioning of the position of the interactive pen point.

SUMMARY

The technical problem for the present invention to solve is to provide an interactive projection apparatus and a positioning method of the projection device, to quickly identify the installation method of the projection device of an interactive projection apparatus employing the automatic correction, so as to precisely calculate the position on the image to be projected corresponding to the clicking position of the interactive pen on the projection image in interactive projection.

To solve the above-mentioned technical problem, the interactive projection apparatus provided by the present invention includes a projection device for displaying an image on the projection plane, a control unit for transmitting said image to the projection device, an interactive pen, and an image acquisition device for collecting information of the projection image on the projection plane and the coordinate of the position indicated by the interactive pen on the projection image; the control unit includes a processing unit, an automatic correction unit, a position identification unit, and a coordinate transformation unit, said processing unit is connected respectively to the automatic correction unit, the position processing unit, and the coordinate transformation unit; the automatic correction unit is employed for corresponding correction of the coordinate of the correction projection image collected by the image acquisition device against the coordinate of the correction image on the control device; the position identification unit identifies the installation mode of the projection device according to the relation between a position identification image and a position identification projection image projected onto the projection plane, said position identification image being stored in the position identification unit or in a computer connected with the projection device, wherein with the horizontal centerline of the position identification image being regarded as the X-axis, the vertical centerline thereof being regarded as the Y-axis, the position identification image is longitudinally asymmetric about the X-axis, and laterally asymmetric about the Y-axis; the coordinate transformation unit is employed for calculating the coordinate on the image to be projected corresponding to the coordinate of the position indicated by the interactive pen on the projection image. Preferably, the position identification image has at least one positioning calibration point or positioning calibration block, said positioning calibration point or positioning calibration block is located in a quadrant of the rectangular coordinate system constructed by the X-axis and the Y-axis.

Wherein the correction image has calibration points or calibration blocks arranged in a rectangular array mode, the calibration points or calibration blocks are longitudinally symmetric about the horizontal centerline of the correction image, and are laterally symmetric about the vertical centerline of the correction image. Preferably, there is arranged one calibration point or calibration block in each of four corners of the correction image, and the calibration points or the calibration blocks are spaced apart with a same distance horizontally, and are spaced apart equidistantly vertically. In addition, preferably, the position identification image is formed by removing the calibration points or calibration blocks of the correction image in a quadrant of a rectangular coordinate system constructed by the horizontal centerline and the vertical centerline of the correction image.

The present invention further provides a positioning method of the interactive pen of the interactive projection apparatus, including correcting the position of a coordinate automatically, identifying the installation mode of the projection device, and calculating the position indicated by the interactive pen;

for correction of the position of the coordinate, firstly project a correction image onto the projection plane, secondly collect the correction projection image on the projection plane, and lastly correct the coordinate of the correction projection image against the coordinate of the correction image;

for identification of the installation mode of the projection device, firstly project a position identification image onto the projection plane, secondly collect the position identification projection image on the projection plane, and lastly identify the installation mode of the projection device according to the relation between the position identification projection image and the position identification image;

for calculation of the position indicated by the interactive pen, calculate the coordinate on the image to be projected corresponding to the coordinate of the position on the projection image indicated by the interactive pen, subsequent to collecting the coordinate of the position indicated by the interactive pen on the projection image;

Wherein, with the horizontal centerline of the position identification image as the X-axis, the vertical centerline thereof as the Y-axis, the position identification image is longitudinally asymmetric about the X-axis and is laterally asymmetric about the Y-axis.

Wherein, firstly perform automatic correction of the coordinate of the position, secondly perform identification of the installation mode of the projection device, and lastly calculate the position indicated by the interactive pen according to the automatic correction of the coordinate of the position and the identification of the installation mode of the projection device; or firstly perform identification of the installation mode of the projection device, secondly perform automatic correction of the coordinate of the position, and lastly calculate the position indicated by the interactive pen according to the identification of the installation mode of the projection device and the automatic correction of the coordinate of the position.

Wherein the projection device is defined as front-projective and desktop-type when the position identification projection image and the position identification image are in a scaling relation; and the projection device is defined as front-projective and ceiling-type if the image of the position identification image revolving 180 degree about a line perpendicular thereto is in a scaling relation with the position identification projection image; the projection device is defined as rear-projective and desktop-type if the lateral mirroring image of the position identification image about the Y-axis is in a scaling relation with the position identification projection image; the projection device is defined as rear-projective and ceiling-type if the longitudinal mirroring image of the position identification image about the X-axis is in a scaling relation with the position identification projection image.

Further, the coordinate $(X_1, Y_1)$ of the position indicated by the interactive pen on the projection image corresponds with a corresponding coordinate $(X_2, Y_2)$ on the image to be projected when the projection device is front-projective and desktop-type, then, the corresponding coordinate on the image to be projected is $(-X_2, -Y_2)$ when the projection device is front-projective and ceiling-type; the corresponding coordinate on the image to be projected is $(-X_2, Y_2)$ when the projection device is rear-projective and desktop-type; the corresponding coordinate on the image to be projected is $(X_2, -Y_2)$ when the projection device is rear-projective and ceiling-type.

In the foregoing method, the processing unit may firstly control the automatic correction unit to perform position correction, next control the position identification unit to perform identification of the installation mode of the projection device, and lastly perform coordinate transformation according to the correction of the automatic correction unit and the identification of the position identification unit. Apparently, the processing unit may firstly control the position identification unit to perform identification of the installation mode of the projection device, next control the automatic correction unit to perform position correction, and lastly perform coordinate transformation according to the identification of the position identification unit and the correction of the automatic correction unit.

The interactive projection apparatus of the present invention is employable on any projection plane, by means of automatic position correction via a correction image, and is capable of precisely identifying the installation mode of the projection device via a position identification image which is longitudinally and laterally asymmetric, prior to or subsequent to the automatic correction.

DETAILED DESCRIPTION

In combination with the above-mentioned Figures and the embodiments hereunder provided, detailed descriptions of the present invention will be further expounded.

Figure 2:
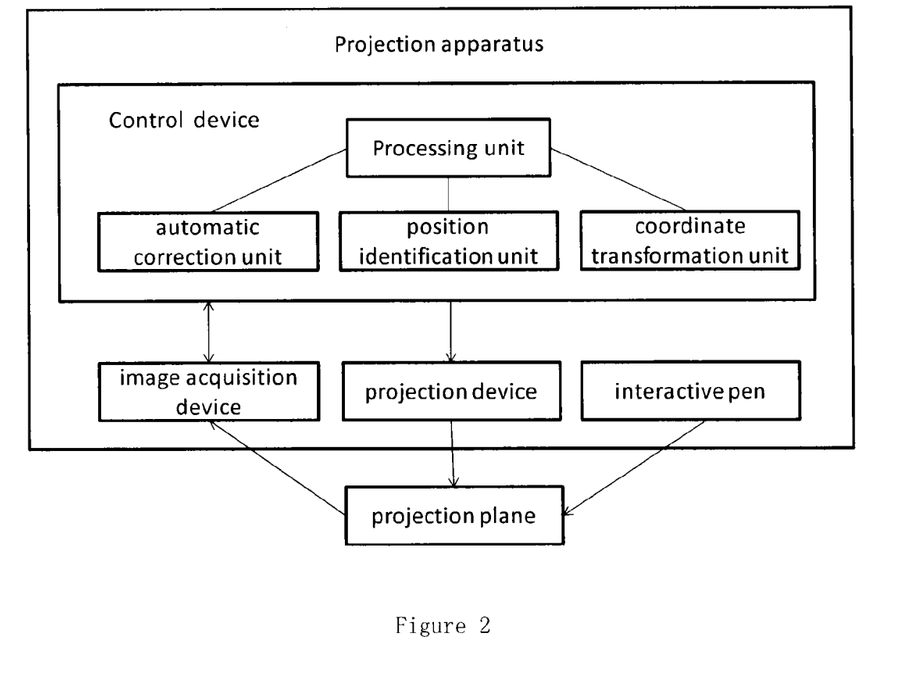
FIG. 2 is a structural diagram of the interactive projection apparatus based on automatic correction and positioning of the present invention.

The interactive projection apparatus provided by the present invention is shown in FIG. 2, which comprises a projection device for displaying an image on the projection plane, a control device for transmitting said image to the projection device, an interactive pen, and an image acquisition device for collecting information of the projection image on the projection plane and the coordinate of the position indicated by the interactive pen on the projection image;

the control device includes a processing unit, an automatic correction unit, a position identification unit, and a coordinate transformation unit, said processing unit is connected to the automatic correction unit, the position identification unit, and the coordinate transformation unit; the control device includes but is not limited to a PC, an SCM, or an embedded system;

the automatic correction unit is employed for corresponding correction of the coordinate of the correction projection image collected by the image collection device against the coordinate of the correction image on the control device;

the position identification unit is employed for identification of the installation mode of the projection device, wherein a position identification image is stored, with the horizontal centerline of the position identification image being regarded as the X-axis, the vertical centerline thereof being regarded as the Y-axis, the position identification image is longitudinally asymmetric about the X-axis, and laterally asymmetric about the Y-axis; preferably, the position identification image has at least one positioning calibration point or positioning calibration block, said positioning calibration point or positioning calibration block is located in a quadrant of the rectangular coordinate system constructed by the X-axis and the Y-axis. Certainly, the position identification image may also be stored in a computer connected with the projection device;

the coordinate transformation unit is employed for calculating the coordinate on the image to be projected corresponding to the coordinate of the position indicated by the interactive pen on the projection image, said mage to be projected may, but is not limited to, be stored in the control device, or stored in a computer connected to the projection device.

Figure 3:
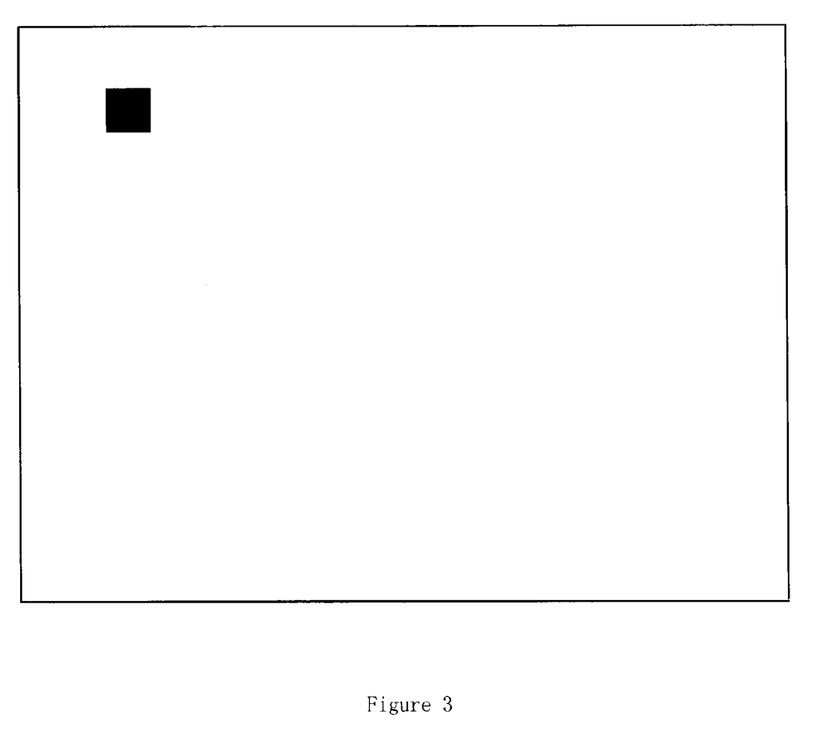
FIG. 3 is a position identification image employed by the interactive projection apparatus in position identification.

Wherein, the correction image has calibration points or calibration blocks arranged in a rectangular array mode, said calibration points or calibration blocks are longitudinally symmetric about the horizontal centerline of the correction image, and are laterally symmetric about the vertical centerline of the correction image. Preferably, there is arranged in each of four corners of the correction image one calibration point or calibration block, and the calibration points or the calibration blocks are spaced apart with a same distance horizontally, and are again spaced apart equidistantly vertically. Calibration points or calibration blocks of commonly-used correction images are 5×5 and 7×7 arrays. The position identification image is formed by deleting the calibration points or calibration blocks of the correction image in a quadrant of a rectangular coordinate system constructed by the horizontal centerline and the vertical centerline of the correction image. That is, firstly perform automatic correction, and next perform position identification, the automatically corrected image is maintained for a certain duration of time subsequent to the completion of the automatic correction, and a certain calibration point or calibration block in a certain quadrant of the correction image is deleted; or, the position identification image has at least one calibration point or calibration block, said calibration points or calibration blocks are located within a quadrant or multiple quadrants of the rectangular system constructed by the X-axis and the Y-axis, so long as the calibration points or calibration blocks are longitudinally asymmetric about the X-axis and are laterally asymmetric about the Y-axis. Preferably, on consideration of identification speed, the position identification image employs one positioning calibration block, as shown in FIG. 3, the positioning calibration block is located in a quadrant of the position identification image, thus meeting the requirement of the position identification image being longitudinally asymmetric about the X-axis and laterally asymmetric about the Y-axis.

The positioning method of the interactive pen of the interactive projection apparatus based on automatic correction of the present invention comprises correcting the position of a coordinate automatically, identifying the installation mode of the projection device, and calculating the position indicated by the interactive pen;

for correction of the position of the coordinate, firstly project a correction image onto the projection plane, secondly collect the correction projection image on the projection plane, and lastly correct the coordinate of the correction projection image against the coordinate of the correction image;

for identification of the installation mode of the projection device, firstly project a position identification image onto the projection plane, secondly collect the position identification projection image on the projection plane, and lastly identify the installation mode of the projection device according to the relation between the position identification projection image and the position identification image;

for calculation of the position indicated by the interactive pen, calculate the coordinate on the image to be projected corresponding to the coordinate of the position on the projection image indicated by the interactive pen, subsequent to collecting the coordinate of the position indicated by the interactive pen on the projection image.

Wherein, firstly perform automatic correction of the coordinate of the position, secondly perform identification of the installation mode of the projection device, and lastly calculate the position indicated by the interactive pen according to the automatic correction of the coordinate of the position and the identification of the installation mode of the projection device; or firstly perform identification of the installation mode of the projection device, secondly perform automatic correction of the coordinate of the position, and lastly calculate the position indicated by the interactive pen according to the identification of the installation mode of the projection device and the automatic correction of the coordinate of the position.

Wherein the projection device is defined as front-projective and desktop-type when the position identification projection image and the position identification image are in a scaling relation; and the projection device is defined as front-projective and ceiling-type if the image of the position identification image revolving 180 degree about a line perpendicular thereto is in a scaling relation with the position identification projection image; the projection device is defined as rear-projective and desktop-type if the lateral mirroring image of the position identification image about the Y-axis is in a scaling relation with the position identification projection image; the projection device is defined as rear-projective and ceiling-type if the longitudinal mirroring image of the position identification image about the X-axis is in a scaling relation with the position identification projection image.

Figure 4:
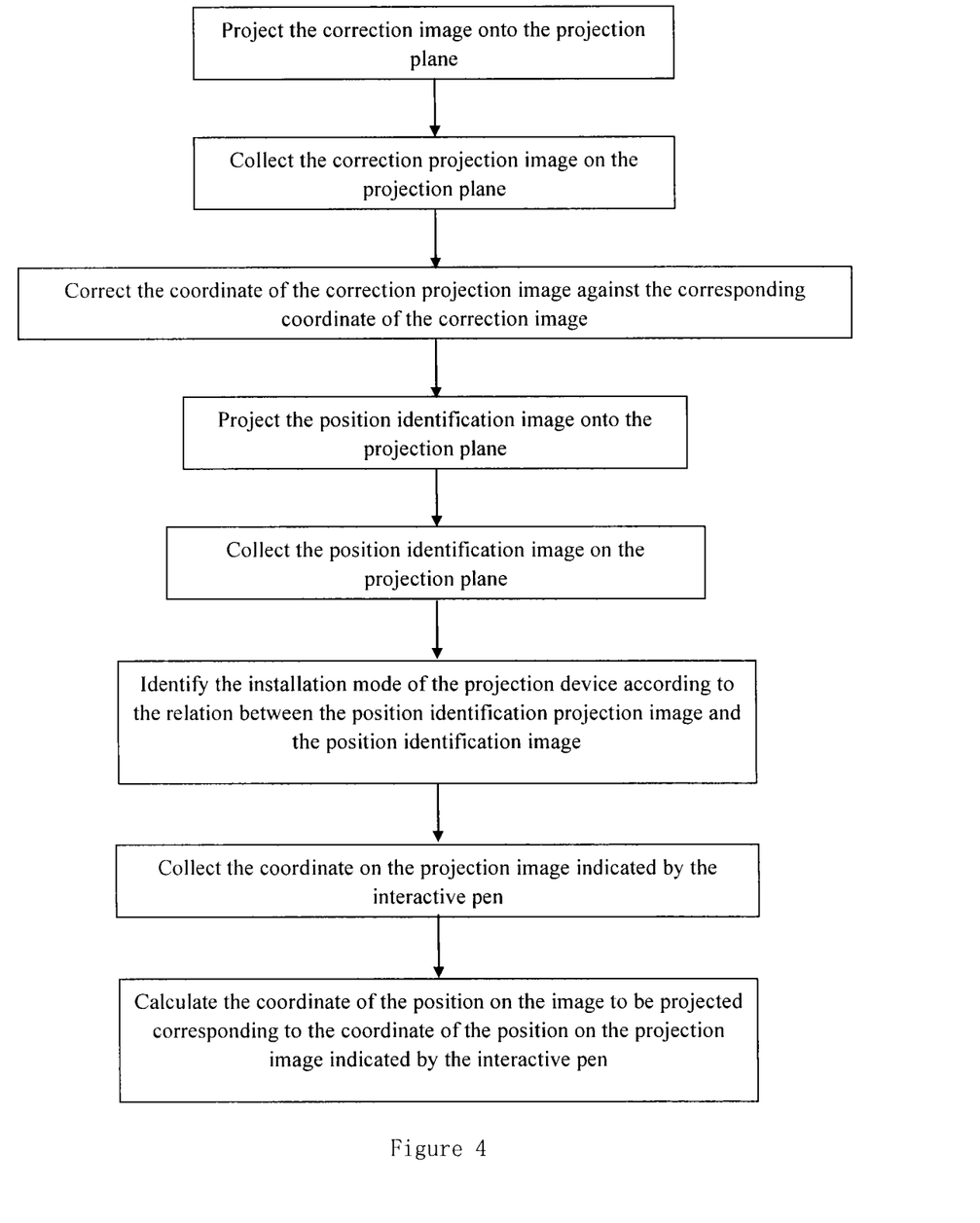
FIG. 4 is a flowchart of the interactive projection apparatus of the present invention for positioning the interactive pen.
Figure 5:
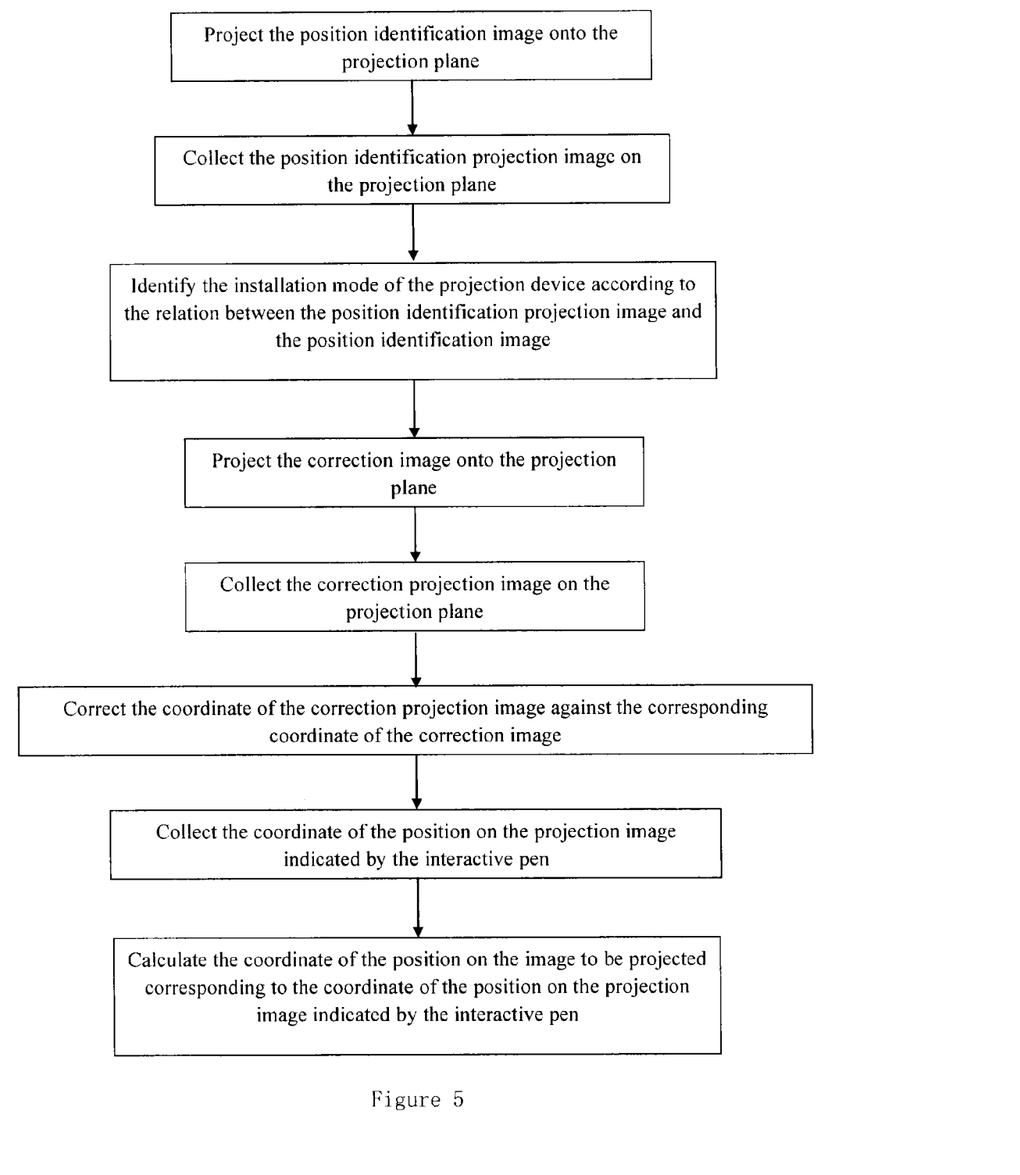
FIG. 5 is another flowchart of the interactive projection apparatus of the present invention for positioning the interactive pen.

The processing unit of the control device may decide the sequence of automatic correction and position identification according to settings and needs, that is, it may first control the automatic correction unit to perform position correction, and next control the position identification unit to perform identification of the installation mode of the projection device (as is shown in FIG. 4), or it may first control the position identification unit to perform identification of the installation mode of the projection device, and next control the automatic correction unit to perform position correction (as is shown in FIG. 5), and the corrected and positioned projection system performs coordinate transformation according to the identification of the position identification unit and the correction of the automatic correction unit. As examples, the coordinate $(X_1,Y_1)$ of the position indicated by the interactive pen on the projection image corresponds with the corresponding coordinate $(X_2,Y_2)$ on the image to be projected when the projection device is front-projective and desktop-type, then, the corresponding coordinate on the image to be projected is $(-X_2,-Y_2)$ when the projection device is front-projective and ceiling-type; the corresponding coordinate on the image to be projected is $(-X_2, Y_2)$ when the projection device is rear-projective and desktop-type; the corresponding coordinate on the image to be projected is $(X_2, -Y_2)$ when the projection device is rear-projective and ceiling-type. Subsequent to the correction and positioning, a user in an interactive projection setting may click with an interactive pen on a given position of the projection image, and the projection system shall be capable of precisely identifying the coordinate of the position on the original image, thus be capable of interaction.

The present invention is thus further expounded with specific embodiments, which are meant to be examples of the preferred embodiments thereof, but are not meant to be limitations therefore. Without departing from the principle of the present invention, equivalent substitutes or improvements to the composition of the projection apparatus, to the distributions or colors of the calibration points or calibration blocks of the position identification image or the correction image, shall be regarded as within the scope of protection of the present invention.

The invention claimed is:

1. An interactive projection apparatus, comprising: a projection device that displays an image on a projection plane, a control device that transmit the image to the projection device, an interactive pen, and an image acquisition device that collects a projection image on the projection plane and collecting a coordinate indicated by the interactive pen on the projection image; wherein, the control device includes a processing circuit, an automatic correction circuit, a position identification circuit, and a coordinate transformation circuit, and the processing circuit is connected respectively to the automatic correction circuit, the position identification circuit, and the coordinate transformation circuit; the automatic correction circuit is configured to correct a coordinate of a correction projection image collected by the image acquisition device against a coordinate of a correction image of the control device; the position identification circuit identifies an installation mode of the projection device according to a relation between a position identification image and a position identification projection image projected onto the projection plane, a horizontal centerline of the position identification image being regarded as an X-axis, a vertical centerline of the position identification image being regarded as a Y-axis, the position identification image is longitudinally asymmetric about the X-axis, and is laterally asymmetric about the Y-axis; the coordinate transformation circuit is configured to calculate a coordinate of an image to be projected corresponding to a coordinate pointed by the interactive pen on the projection image.

2. The interactive projection apparatus according to claim 1, wherein the correction image includes calibration points or calibration blocks arranged in a rectangular array mode, the calibration points or the calibration blocks being longitudinally symmetric about the horizontal centerline of the correction image, and being laterally symmetric about the vertical centerline of the correction image.

3. The interactive projection apparatus according to claim 2, wherein there is arranged one calibration point or calibration block in each of four corners of the correction image, and the calibration points or the calibration blocks are spaced apart with a same distance horizontally, and are spaced apart equidistantly vertically.

4. The interactive projection apparatus according to claim 2, wherein the position identification image is formed by removing the calibration points or calibration blocks of the correction image in a quadrant of a rectangular coordinate system constructed by the horizontal centerline and the vertical centerline of the correction image.

5. The interactive projection apparatus according to claim 1, wherein the position identification image has at least one positioning calibration point or positioning calibration block located in one quadrant of a rectangular coordinate system constructed by the X-axis and the Y-axis.

6. The interactive projection apparatus according to claim 1, wherein the projection device is defined as front-projective and desktop-type when the position identification projection image and the position identification image are in a scaling relation, then, if an image of the position identification image revolving 180 degrees about a line vertical thereto is in a scaling relation with the position identification projection image, the projection device is front-projective and ceiling-type; if a laterally mirroring image of the position identification image about the Y-axis is in a scaling relation with the position identification projection image, the projection device is rear-projective and desktop-type; and if a vertically mirroring image of the position identification image about the X-axis is in a scaling relation with the position identification projection image, the projection device is rear-projective and ceiling-type.

7. The interactive projection apparatus according to claim 6, wherein the coordinate of the position pointed by the interactive pen on the projection image being $(X_1,Y_1)$, has a corresponding coordinate on the image to be projected being $(X_2,Y_2)$ when the projection device is front-projective and desktop-type, then, when the projection device is front-projective and ceiling-type, the corresponding coordinate on the image to be projected is $(-X_2,-Y_2)$; when the projection device is rear-projective and desktop-type, the corresponding coordinate on the image to be projected is $(-X_2,Y_2)$; and when the projection device is rear-projective and ceiling-type, the corresponding coordinate on the image to be projected is $(X_2,-Y_2)$.

8. The interactive projection apparatus according to claim 1, wherein the processing circuit firstly controls the automatic correction circuit to perform position correction, secondly controls the position identification circuit to perform identification of the installation mode of the projection device, and lastly performs coordinate transformation according to the position correction of the automatic correction circuit and the identification of the position identification circuit.

9. The interactive projection apparatus according to claim 1, wherein the processing circuit firstly controls the position identification circuit to perform identification of the installation mode of the projection device, secondly controls the automatic correction circuit to perform position correction, and lastly performs coordinate transformation according to the identification of the position identification circuit and the position correction of the automatic correction circuit.

10. A positioning method of an interactive pen of an interactive projection apparatus, comprising: correcting a position of a coordinate automatically, identifying installation mode of a projection device, and calculating a position pointed by the interactive pen, wherein correcting a position of the coordinate automatically includes, projecting a correction image onto a projection plane, collecting a correction projection image on the projection plane, and correcting a coordinate of the correction projection image against a coordinate of the correction image; identifying installation mode of a projection device, including, projecting a position identification image onto the projection plane, collecting a position identification projection image on the projection plane, and identifying the installation mode of the projection device according to a relation between the position identification projection image and the position identification image; and calculating a position indicated by an interactive pen including, calculating a coordinate on an image to be projected corresponding to the coordinate of the position on the projection image indicated by the interactive pen, subsequent to collecting the coordinate of the position pointed by the interactive pen on the projection image, wherein, a horizontal centerline of the position identification image being regarded as the X-axis, a vertical centerline thereof being regarded as the Y-axis, the position identification image is longitudinally asymmetric about the X-axis and is laterally asymmetric about the Y-axis.

11. The positioning method of the interactive pen of the interactive projection apparatus according to claim 10, wherein the correction image has calibration points or calibration blocks arranged in a rectangular array mode, the calibration points or calibration blocks being longitudinally symmetric about the horizontal centerline of the correction image, and being laterally symmetric about the vertical centerline of the correction image.

12. The positioning method of the interactive pen of the interactive projection apparatus according to claim 11, wherein there is arranged one calibration point or calibration block in each of four corners of the correction image, and the calibration points or the calibration blocks are spaced apart with a same distance horizontally, and are spaced apart equidistantly vertically.

13. The positioning method of the interactive pen of the interactive projection apparatus according to claim 11, wherein the position identification image is formed by removing the calibration points or calibration blocks of the correction image in a quadrant of a rectangular coordinate system constructed by the horizontal centerline and the vertical centerline of the correction image.

14. The positioning method of the interactive pen of the interactive projection apparatus according to claim 10, wherein the position identification image has at least one positioning calibration point or positioning calibration block located in one quadrant of a rectangular coordinate system constructed by the X-axis and the Y-axis.

15. The positioning method of the interactive pen of the interactive projection apparatus according to claim 10, wherein the projection device is defined as front-projective and desktop-type when the position identification projection image and the position identification image are in a scaling relation, then, the projection device is defined as front-projective and ceiling-type if an image of the position identification image revolving 180 degrees about a line vertical thereto is in a scaling relation with the position identification projection image; the projection device is defined as rear-projective and desktop-type if a lateral mirroring image of the position identification image about the Y-axis is in a scaling relation with the position identification projection image; the projection device is defined as rear-projective and ceiling-type if a longitudinal mirroring image of the position identification image about the X-axis is in a scaling relation with the position identification projection image.

16. The positioning method of the interactive pen of the interactive projection apparatus according to claim 15, wherein the coordinate $(X_1,Y_1)$ of the position pointed by the interactive pen on the projection image corresponds with a corresponding coordinate $(X_2,Y_2)$ on the image to be projected when the projection device is front-projective and desktop-type, then, the corresponding coordinate on the image to be projected is $(-X_2,-Y_2)$ when the projection device is front-projective and ceiling-type; the corresponding coordinate on the image to be projected is $(-X_2,Y_2)$ when the projection device is rear-projective and desktop-type; and the corresponding coordinate on the image to be projected is $(X_2,-Y_2)$ when the projection device is rear-projective and ceiling-type.

17. The positioning method of the interactive pen of the interactive projection apparatus according to claim 10, further comprising: firstly performing automatic correction of the coordinate of the position; secondly performing identification of the installation mode of the projection device; and lastly calculating the position indicated by the interactive pen according to the automatic correction of the coordinate of the position and the identification of the installation mode of the projection device.

18. The positioning method of the interactive pen of the interactive projection apparatus according to claim 10, wherein performing identification of the installation mode of the projection device includes: performing automatic correction of the coordinate of the position; and calculating the position indicated by the interactive pen according to the identification of the installation mode of the projection device and the automatic correction of the coordinate of the position.

* * * * *